J. F. HECKERT.
BAGGAGE CARRIER.
APPLICATION FILED OCT. 7, 1908.
929,088.
Patented July 27, 1909.
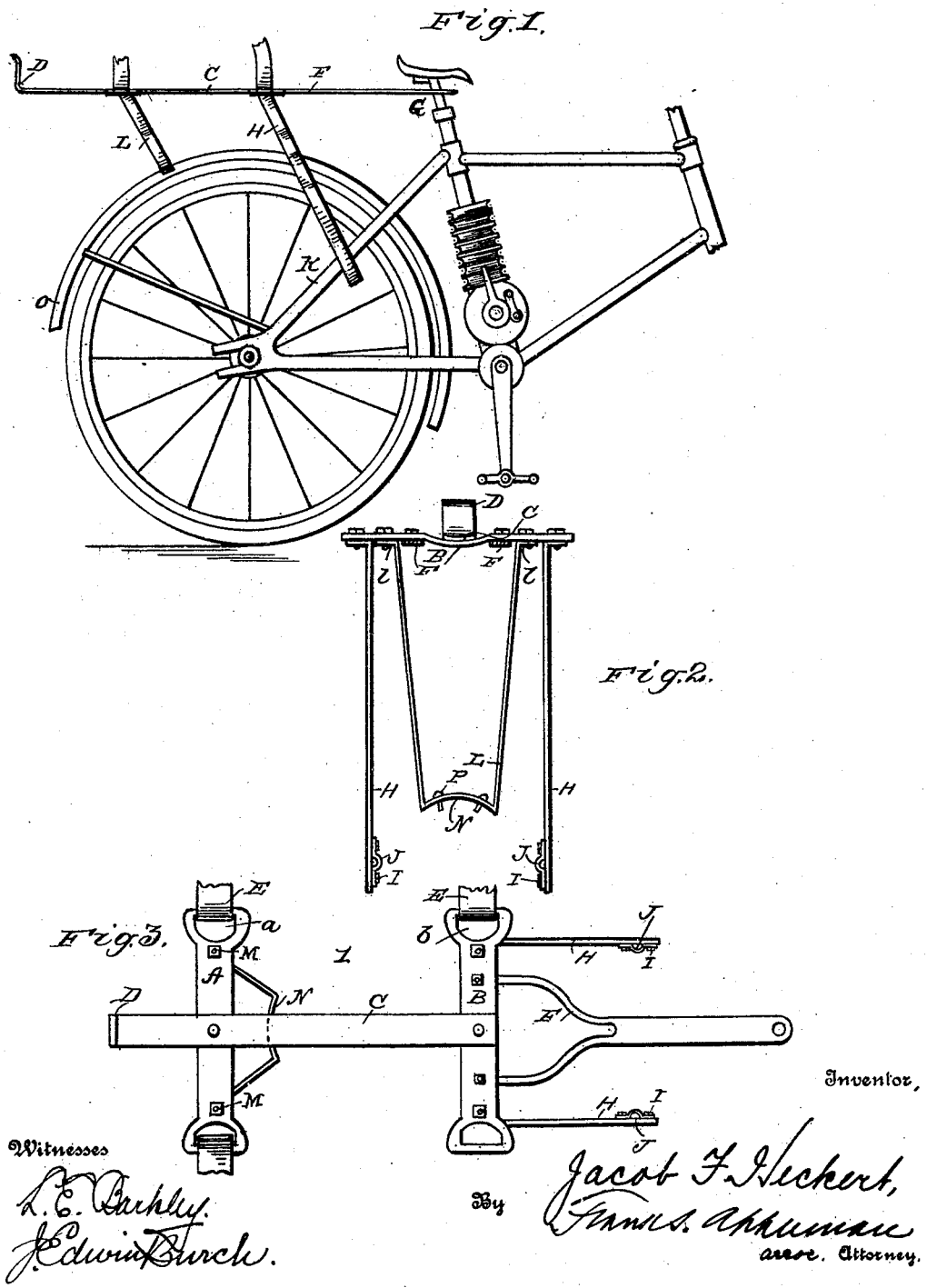

UNITED STATES PATENT OFFICE.

JACOB F. HECKERT, OF HARRISBURG, PENNSYLVANIA.

BAGGAGE-CARRIER.

No. 929,088.     Specification of Letters Patent.     Patented July 27, 1909.

Application filed October 7, 1908. Serial No. 456,577.

*To all whom it may concern:*

Be it known that I, JACOB F. HECKERT, a citizen of the United States of America, residing at Harrisburg, in the county of Dauphin and State of Pennsylvania, have invented certain new and useful Improvements in Baggage-Carriers, of which the following is a specification.

This invention relates to vehicles and particularly to luggage carriers therefor.

An object of this invention is to provide a frame designed primarily for use on bicycles and particularly on motor cycles, the said carrier comprising a frame having novel means for attaching it to the bicycle in order to afford rigidity of structure, the said carrier being applied to the rear portion of the bicycle and having means for attaching it to the frame of a bicycle and the seat post thereof.

A still further object of this invention is to produce a luggage carrier proving strong and durable, yet comparatively light in weight, and furthermore, the object of the invention is to provide a luggage carrier which can be knocked down, that is to say, the parts may be disconnected and stored in a small space.

With the foregoing and other objects in view, the invention consists in the details of construction and in the combination and arrangement of parts to be hereinafter more fully set forth and claimed.

In describing the invention in detail, reference will be had to the accompanying drawings, forming part of this specification wherein like characters denote corresponding parts in the several views, in which—

Figure 1, illustrates a portion of a motor cycle with the invention applied thereto, Fig. 2, illustrates an end view thereof, and Fig. 3, illustrates a plan view thereof.

In these drawings, I show the carrier as having a frame consisting of two transversely disposed strips A, B, connected by a central strip C, the said central strip extending beyond the strip A, and having its end turned up to form a shoulder D, adapted to engage luggage applied to the frame.

The ends of the strips A and B have eyes *a*, *b*, respectively, adapted to receive straps or other flexible connections E, the said straps of each strip being adapted to pass over the bundle or object placed on the frame. It is understood, of course, that the straps or flexible connections shall have means for attaching their ends together in order that the package or contents of the frame may be held thereon.

The cross strip B, is provided with a series of apertures to receive securing bolts and in order to secure the frame to a vehicle, such as a motor cycle, a harp brace F, has its diverging ends extending under the strip B, and the bolts are utilized to attach the harp to the said cross strip. The outer end of the harp has an aperture to receive the expansion screw G, usually employed on said posts of motor cycles. As a further means for securing the frame in place, two diagonally disposed braces H are provided, said braces having their upper ends bent to form ears which lie parallel to the cross strip B and said ears secured to the cross strip by the bolts. The lower ends of the braces have apertures to receive the bolts I, by which the clips J are clamped into engagement with the rear braces K, of a motor cycle.

A yoke L, has its two ends provided with ears *l*, *l*, secured to the cross strip A, by means of bolts M, and the lower end of the said yoke is concaved as shown at N, to form a seat for the mud guard O, of a motor cycle, that is to say, the yoke rests on the convex surface of the mud guard and is secured thereto by bolts or rivets P, which pass through apertures of the yoke and mud guard.

It will be seen from the foregoing description and an inspection of the drawings that the luggage carrier may be applied to, or removed from, the frame of a motor cycle or vehicle, and it will also be observed that when the said luggage carrier is properly secured in place, it will be well braced and that it will support comparatively heavy loads.

I claim:

In a luggage carrier, a frame comprising two transversely disposed strips and a longitudinally disposed strip connected to the transversely disposed strip, flexible devices connected to the ends of the transversely disposed strip, a harp having diverging ends connected to the forward transversely disposed strip and to the seat post of a machine, braces extending from the forward transversely disposed strip to the rear braces of the machine frame, a yoke having a concaved lower end adapted to rest on a mud guard of a machine, and means for detachably securing the sections of the luggage carrier together.

In testimony whereof I affix my signature in the presence of two witnesses.

JACOB F. HECKERT.

Witnesses:
  Wm. C. Armor,
  Francis J. Ott.